(12) United States Patent
Roy et al.

(10) Patent No.: US 6,458,405 B1
(45) Date of Patent: Oct. 1, 2002

(54) GEL PRODUCTS WITH CARRAGEENAN

(75) Inventors: Soumya Roy, Plymouth, MN (US); Ann L Ryan, Eden Prairie, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/617,074

(22) Filed: Jul. 17, 2000

(51) Int. Cl.⁷ .............................................. A23L 1/0532
(52) U.S. Cl. ...................................................... 426/575
(58) Field of Search ................................ 426/573, 575, 426/577, 658, 660, 655

(56) References Cited

U.S. PATENT DOCUMENTS

| | | | |
|---|---|---|---|
| 1,627,138 A | | 5/1927 | Bausman |
| 2,272,990 A | | 2/1942 | Forkner et al. |
| 2,650,880 A | | 9/1953 | Erickson |
| 2,855,315 A | | 10/1958 | Perrozzi et al. |
| 3,563,769 A | | 2/1971 | Horn |
| 4,096,327 A | * | 6/1978 | Guiseley ..................... 426/575 |
| 4,515,822 A | | 5/1985 | Kraig et al. |
| 4,542,033 A | | 9/1985 | Agarwala |
| 4,722,847 A | | 2/1988 | Heckert |
| 4,737,375 A | | 4/1988 | Nakel et al. |
| 4,784,871 A | | 11/1988 | Park |
| 4,786,510 A | | 11/1988 | Nakel et al. |
| 4,830,862 A | | 5/1989 | Braun et al. |
| 4,853,236 A | | 8/1989 | Langler |
| 4,886,678 A | | 12/1989 | Chiu et al. |
| 4,961,943 A | | 10/1990 | Blanthorn et al. |
| 4,988,531 A | | 1/1991 | Moore et al. |
| 4,992,282 A | | 2/1991 | Mehansho et al. |
| 5,059,441 A | | 10/1991 | Bunick et al. |
| 5,084,296 A | | 1/1992 | Lugay et al. |
| 5,186,965 A | | 2/1993 | Fox et al. |
| 5,208,059 A | | 5/1993 | Dubowik et al. |
| 5,338,560 A | * | 8/1994 | Wesdorp et al. ............ 426/573 |
| 5,364,643 A | | 11/1994 | Morimoto et al. |
| 5,445,837 A | | 8/1995 | Burkes et al. |
| 5,455,053 A | | 10/1995 | Zimmermann et al. |
| 5,607,716 A | * | 3/1997 | Doherty et al. ............. 426/572 |
| 5,747,080 A | | 5/1998 | Lemke et al. |
| 5,820,903 A | | 10/1998 | Fleury et al. |
| 5,840,354 A | | 11/1998 | Baumann et al. |
| 5,942,268 A | | 8/1999 | Zimmermann et al. |
| 6,077,557 A | | 6/2000 | Gordon et al. |
| 6,123,016 A | | 9/2000 | McGuire et al. |
| 6,165,531 A | | 12/2000 | Harding et al. |

FOREIGN PATENT DOCUMENTS

| | | |
|---|---|---|
| DE | 28 36 140 A | 2/1980 |
| FR | 2796248 A | 1/2001 |
| GB | 1 564 452 | 4/1980 |

\* cited by examiner

*Primary Examiner*—Keith Hendricks
(74) *Attorney, Agent, or Firm*—John A. O'Toole; Douglas J. Taylor; Everett G. Diederiks, Jr.

(57) ABSTRACT

Improved, intermediate moisture sweetened gelled food compositions comprise: A) about 55 to 85% by weight nutritive carbohydrate sweeteners; B) sufficient amounts of a gelling system to provide a gel strength of about 1–8 kg/cm²; C) about 10% to 20% moisture. The gelling system comprises high methoxyl pectin and kappa carrageenan. The gelling system allows for a high solids level but a low viscosity when maintained above 130° F. Also disclosed are methods for the preparation of such gelled products involving forming a hot fluid high solids gellable slurry, forming the hot fluid gellable slurry into pieces such as by starch molding and curing to form gelled food product in the form of pieces of about 1 to 5 g. By virtue of the high solids concentrations the duration of the curing step is greatly reduced.

28 Claims, 1 Drawing Sheet

GEL PRODUCTS WITH CARRAGEENAN

FIELD OF THE INVENTION

The present invention relates to food products and to their methods of preparation. More particularly, the present invention relates to confectionery gelled food products, especially fruit based, and to their methods of preparation.

BACKGROUND OF THE INVENTION

The present invention provides an improvement in gelled food products such as prepared by starch molding and to their methods of preparation. In particular, the present invention provides fruit based compositions for starch molded gelled food products having an improved blend of gelling agents. The improved gelling agent blends allow for, and the present invention provides product preparation methods that comprise, shorter drying times during curing by conventional starch molding techniques. The products exhibit improved eating texture.

Wholesome snacks prepared from sweetened intermediate moisture shelf stable fruit or "fruit snacks" herein have recently become popular food items. These compositions are sold in various physical forms and shapes such as: 1) in rolled sheet form; 2) in rolled strip form; 3) in string form mounted on a U-board; 4) soft center filled pieces, and 5) in gelled bite size pieces of various shapes or in gelled bite size piece form prepared by starch molding.

Generally, these products are prepared from wet mixtures of the various fruit materials and added ingredients that are dried to desired moisture contents. The dehydrated compositions are formed into articles of desired shapes and sizes. In other variations, all or a portion of the fruit material is substituted with pure sugars. Such low fruit, high sugar formulations can be flavored with fruit flavors and/or other flavors. Within this general similarity, however, the particular methods of preparation, product formulations and apparatus used to prepare particular products vary considerably. Moreover, such variations are highly interdependent. Formulations and method steps suitable for one product form might or might not be suitable for another product form.

Particularly popular products are in rolled sheet form such as are sold under the Fruit Roll-Ups brand. Popular products rolled strip form are sold under the Fruit By The Foot brand (see also, U.S. Pat. No. 5,455,053 entitled "Rolled Food Item" issued Oct. 3, 1995). Food products in string form mounted on a U-board are sold under the String Thing™ mark while other products in bite size pieces of various shapes are sold under various brands. (See, for example, commonly assigned U.S. Pat. No. 5,942,268 entitled "Embossed Shape Food Item" issued Aug. 24, 1999 to Zimmermann et al.). Soft center filled pieces products are described in U.S. Pat. No. 4,853,236 entitled "Dual Textured Food Piece Of Enhanced Stability Using An Oil In Water EMULSION" (issued Mar. 18, 1988 to Langler et al.) while apparatus and fabrication methods therefor are described in U.S. Pat. No. 5,208,059 entitled "Dual Textured Food Piece Fabrication Apparatus" (issued Jun. 10, 1992 to Dubowik et al.).

In particular, the present invention provides further improvements in the gelled food products in bite size pieces and their methods of preparation taught in related commonly assigned U.S. Ser. No. 6,077,557 entitled "Gel Products Fortified With Calcium And Method Of Preparation" (issued Jun. 20, 2000 to Gordon et al.) and which is incorporated herein by reference. In that application, a calcium slurry is prepared comprising calcium phosphate salts and propylene glycol and/or glycerin. This calcium bearing slurry is added to other materials such as sugars and fruit purees to form a calcium bearing fluid gellable blend or slurry. The calcium bearing gellable blend is then further processed such as by forming that blend into shaped pieces and curing and drying to form finished calcium fortified gelled food pieces.

Also, the present invention further provides an improvement towards an alternative to that calcium-in-propylene glycol and/or glycerine slurry such as is disclosed in commonly assigned U.S. Ser. No. 09/596,512 entitled "Gel Products Fortified With Calcium And Methods Of Preparation" (filed Jun. 19, 2000 by Gordon et al.) and which is incorporated herein by reference. In U.S. Ser. No. 09/596,512 a calcium phosphate-in-liquid fat slurry can be used in full or partial substitution for the benefits of better flavor, better shelf life and possibly greater bioavailability of the calcium.

In each of the '557 patent and U.S. Ser. No. 09/596,512, the gellable calcium bearing compositions are formed into pieces, and cured by conventional starch molding. The curing step involves the formation of the gel structure of the gelling agents, and optional heating of the products to remove excess moisture and eventual cooling down of the products to form a gel that is able to withhold its individual shape. The conventional starch molding step is practiced with extended curing time ranging from about 16 to 48 hours. However, in the present invention, by virtue of the present improved gelling systems, the starch molding curing times can be substatially reduced. Also, in the present invention, in the preferred embodiment, calcium is an optional ingredient.

These dried fruit products are especially popular with children, particularly as snack or convenience foods. To continue to appeal to children, manufacturers must introduce frequent changes to such products. For example, the shapes of the products can be changed to employ currently popular character-shapes such as from a movie, television show, cartoons, etc. An advantage of starch molding is that such shape changes can be made quickly, cheaply, and easily.

In starch molding, shapes are stamped into a bed of starch forming cavities. A gellable fluid mixture is charged to the cavities and is allowed to cure to harden and to dry to form thereby gelled food products.

One problem, however, with starch molding is that holding times for curing are lengthy and can generally range from one to several days. After curing the shaped pieces are removed from the starch.

Thus, it would be desirable to reduce starch molding curing times. One approach to reducing curing times is simply to increase the solids content of the fluid gellable mixture being deposited so as to reduce degree of the drying required and thus to reduce the curing time. However, increasing the solids content can also increase the viscosity of the fluid mixture which in turn can impair the ability to properly fill the starch cavities and thus lead to product shape defects. The mixture can also be prone to premature gelling causing fouling and other processing and starch cavity mold filling problems.

In view of the current state of the gelled food art, there is a continuing need for new and improved formulations and methods for preparing gelled shaped food products.

The present invention satisfies this need by providing compositions and methods for preparing such starch molded gelled bite size dried fruit products that are characterized by reduced drying and thus reduced curing times. In part, the present invention involves providing a gellable sweetened fruit fluid slurry of increased solids intermediate product that nonetheless has lower or comparable viscosities that allows for successful starch molding.

In particular, it is an object of the present invention to provide methods for preparing fortified sweetened dried gelled fruit compositions of reduced cure times.

Still another object of the present invention is to provide high solids content gellable food slurry product intermediates useful in the preparation of gelled food products.

It has been surprisingly discovered that the above objectives can be realized and superior dried sweetened fruit provided by formulating compositions, comprising: nutritive carbohydrate sweeteners especially those provided by fruit solids, an improved gelling system comprising kappa carrageenan as an essential component, and moisture. The present invention further provides novel methods of preparation of such gel products involving characterized by reduced drying times.

BRIEF DESCRIPTION OF THE DRAWINGS

The illustrative embodiment may best be described by reference to the accompanying drawings where.

SUMMARY OF THE INVENTION

Figure 1:
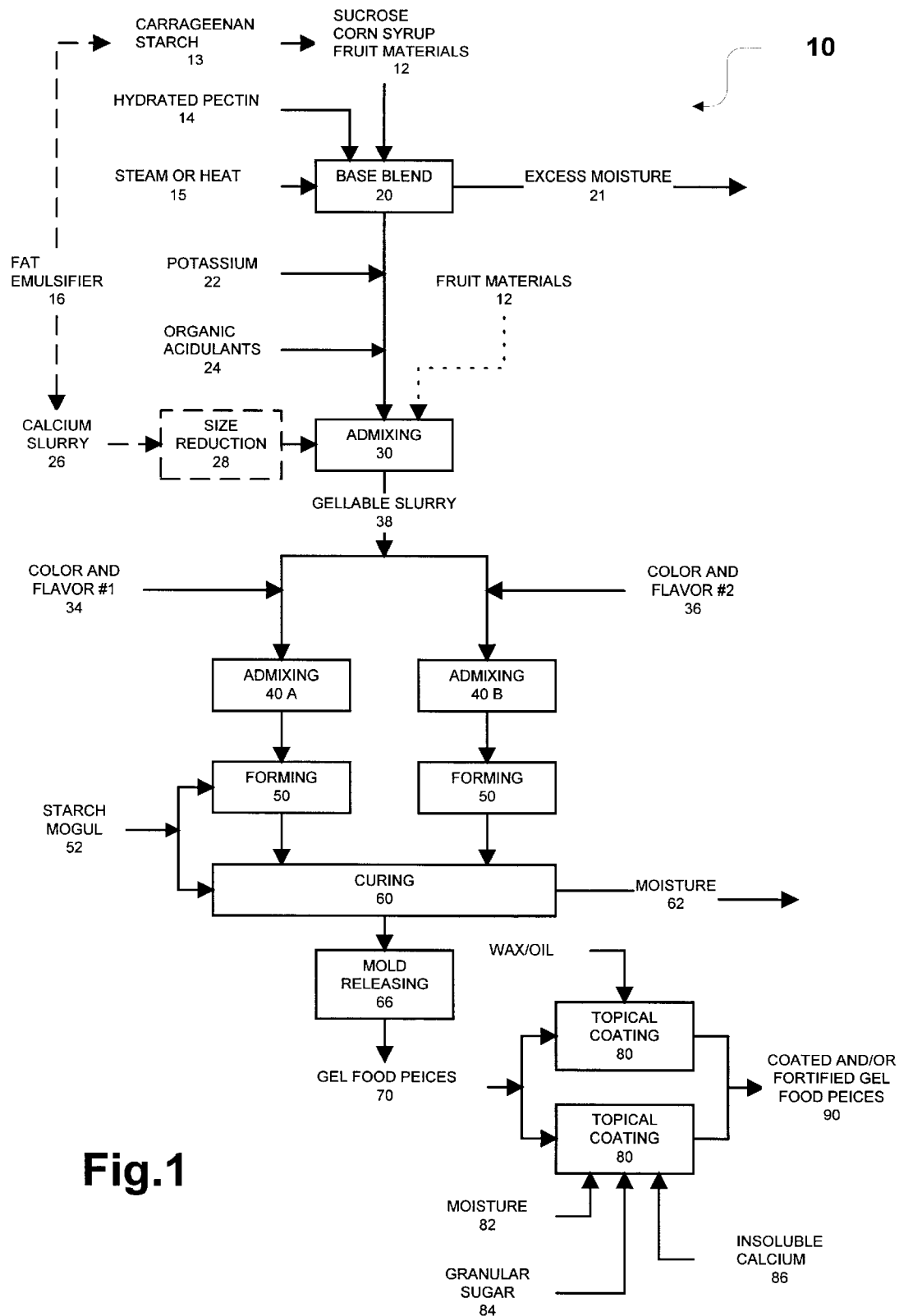
FIG. 1 is block flow diagram of a process according to a method aspect of the present invention.

In its product aspect, the present invention is directed towards sweetened, dried food compositions such as bite sized pieces, comprising about 55% to 80% nutritive carbohydrate sweeteners; a gelling system, about 0.1% to about 1% of an edible organic acidulant, and about 10 to 25% moisture. The gelling system comprises about 0.5% to about 2% of an added high methoxyl pectin having a degree of esterification ("D.E.") ranging from about 50 to 65; and about 0.1% to about 0.6% kappa carrageenan. The food products have a water activity ranging from about 0.5 to 0.65.

In its process aspect, the present invention resides in methods of preparing a gelled dried sweetened fruit product such as prepared by starch molding. The methods comprise the steps in sequence of:

Providing a slurry gel base comprising nutritive carbohydrate sweeteners, sufficient amounts of a gelling agent (such as pectin, carrageenan, gelatin, and/or starch) to provide a gel strength in the finished product of about 1 to 8 Kg/cm² force, an insoluble calcium phosphate of the requisite particle size to provide a total calcium content of about 50 to 1500 mg of calcium per 1 oz of product (0.15 to 5.5% by weight calcium) and moisture adding;

Adding sufficient amounts of an edible organic acidulant to the fruit base to provide a gellable fruit base having a pH ranging from about 3.0 to 5.5; to form a calcium fortified gellable base;

Forming the base calcium fortified fruit base into suitably sized and shaped individual pieces; and Curing the pieces to form gelled pieces.

The curing step is of shorter duration.

DETAILED DESCRIPTION OF THE INVENTION

The present invention provides improved, intermediate moisture sweetened food compositions and further provides methods for preparing such compositions. Each of these components as well as product properties, preparation and use are described in detail below.

Throughout the specification and claims, percentages are by weight and temperatures in degrees Centigrade unless otherwise indicated.

Sweeteners

A principal essential component of the present invention food compositions and food products prepared therefrom is one or more nutritive carbohydrate sweeteners or sugars. The present gelled compositions essentially comprise about 55% to about 80% dry weight basis of such nutritive carbohydrate sweeteners, preferably about 55% to about 70%, and for best results about 60% to about 65%. Such sugars not only provide taste and nutritional properties but also influence the texture and structure of the present products.

Nutritive carbohydrate sweeteners are well known in the art and the skilled artisan will have no difficulty in selecting particular ingredients for use herein as the nutritive carbohydrate sweetener component. Generally, however, the term "nutritive carbohydrate sweetening agent" is used herein to mean those typical purified sweetening agents conventionally used in food products. Of course, the present nutritive carbohydrate-sweetening agents are to be distinguished from non-nutritive carbohydrate high potency sweetening agents such as saccharine, cyclamate, and the like. Additionally, the present nutritive carbohydrate-sweetening agents are to be distinguished from such protein-based sweetening agents as aspartame, thaumatin, and monellin.

Suitable materials for use as nutritive carbohydrate sweetening agents are well known in the art. Examples of sweetening agents include both monosaccharide and disaccharide sugars such as sucrose, invert sugar, dextrose, lactose, honey, maltose, fructose, maple syrup and corn syrup or corn syrup solids. Preferred pure nutritive carbohydrate sweetening agents are those selected from the group consisting of sucrose, glucose, fructose, corn syrup solids, and honey. Highly preferred nutritive carbohydrate sweetening agents are those selected from the group consisting of sucrose, corn syrup solids, dextrose, maltose and fructose. Of course, mixtures of the above-noted materials are contemplated herein. Preferred for use herein is a combination of sucrose, corn syrup and fruit juice solids.

In a preferred embodiment, the ratio of monosaccharide to disaccharide sweeteners is controlled so as to minimize the development of unwanted properties in the finished food product over storage such as the development of crystals. To that end, the ratio can be and preferably does range from about 0.5:1 to about 1.8:1, and more preferably, about 0.7:1 to about 1.5:1.

In preferred embodiments, the food compositions herein and gelled products prepared therefrom are fruit products. In such preferred embodiments, the food compositions and gelled products prepared therefrom are further essentially characterized by having at least a portion of the nutritive carbohydrate sweeteners as being provided by or from fruit sources or fruit solids. The fruit solids can be derived from fruit purees or juices prepared from whole fruit flesh or if such purees have been partially dehydrated, fruit paste. The term "puree" has been used in the art to refer to both heat treated, e.g., boiled and untreated food pulp. As used herein, however, "puree" is meant to refer both to heat and unheat-treated whole fruit pieces, which have been mechanically transformed into fluids. Thus, the present comminuted fruit material can be distinguished from discrete individual pieces of intact fruit flesh.

Both unseeded and, preferably, deseeded purees can be used. Fruit puree generally contains about 35 to 90% moisture. Other edible fruit portions, such as fruit pulp can also supply the fruit solids component. Fruit pulp is the material remaining after fruit juices have been removed from fruit puree. Additionally useful herein for supplying the fruit solids are various fruit juices whether single strength or concentrated.

Fruit materials from any fruit can be used herein. Examples of such fruits useful herein include apricot, pineapple, lemon, orange, peach, pear, lime, banana, grape, mango, apple, tomato, blackberry, plum, watermelon, blueberry, raspberry, strawberry, current, cherry, cranberry, and mixtures thereof. Preferred fruits are selected from the group consisting of apples, strawberries, cherries, pears, blueberries, raspberries, grapes, oranges and mixtures thereof. Most highly preferred for use herein are grapes, strawberries, pears, oranges and cherries. Concentrated pear juice or white grape juice are highly preferred due to their low cost, white or neutral apprearance and bland flavor. Such neutral features allow for addition of particular flavors and colors to provide particular products of desired color and flavor.

Fresh fruit is, of course, useful for preparing the products herein. However, previously frozen fruit, canned fruit, partially dehydrated fruit or rehydrated fruit, as well as frozen juices, concentrates, nectars, powders or frozen juice pulps are also suitable for use herein. When frozen fruit is employed, e.g., "four plus one" strawberries, i.e., frozen strawberries with one quarter part by weight added sugar, only the fruit solids contribution is to be considered.

While the present invention is primarily directed towards fruit containing products, the skilled artisan will appreciate that the present invention is equivalently applicable to all edible plant solids, especially ordinary garden-variety vegetables. The sugars, flavors, acids, pectinaceous or cellulosic fibers and ash of which plant solids are typically comprised are intended to be included within the term edible plant solids. However, "edible plant solids" is not intended to include such starch fractions as wheat or other cereal flours nor oleaginous materials such soybean oil. That is, the present fruit solids can be wholly or partially replaced with equivalent amounts of ordinary garden vegetable solids. However, vegetable flavored products are not nearly as popular as those, which are fruit, flavored. However, certain vegetables, e.g., pumpkin, squash and carrot enjoys some popularity as novelty items.

Also useful herein are fruit juice solids especially from inexpensive fruit sources such as grape juice, apple juice, and pear juice. If present, such juice solids can constitute about 0.1 to about 70% of the finished fruit snack products herein.

In even more preferred embodiments, the present compositions essentially comprise from about 5 to 100% (dry weight basis) of the nutritive carbohydrate sweetener component of fruit or plant solids. That is, if 100 g of a gelled product has a total sweetener component of 60% (wet basis), then in the preferred embodiment, at least 3 g thereof are provided from fruit solids. Better results in terms of natural flavor and color but at economical costs are obtained when the fruit solids are present at from about 5 to 25% of the sweetener component. Best results are obtained when the fruit solids are comprise about 5 to 15% of the nutritive carbohydrate sweetener component.

If desired, the present compositions and present gelled products can additionally comprise supplemental high potency sweeteners such as saccharine, aspartame, thaumatin, potassium acetylsulfame, and mixtures thereof. Other suitable high potency sweeteners that become permitted for use or commercially available from time to time can also be used.

Gelling Agent

The present gelled food compositions further essentially comprise a particular combination of gelling agents or gelling system comprising a particular added pectin, carrageenan and optionally but preferably additionally comprising a thin boiling starch in sufficient amounts of a gelling system to provide the finished products with a gel strength at the desired moisture levels herein of about 1–8 Kg/cm$^2$ force.

The first essential component of the gelling system is an added. slow setting high methoxyl-pectin. It will be appreciated that the fruit solids, if employed, will additionally provide some native amount of pectin. The present added slow setting high methoxyl pectin is in addition to any pectin provided by such fruit ingredients. Pectins are divided or classified according to their degree of esterification ("D.E.") since this property greatly influences their functional characteristics. Below 50 D.E, pectins are characerized as low methoxyl pectin's and are classified set, i.e., require the presence of low levels of soluble calcium ions to set or form gels. In contrast, above 50 D.E, pectins are characterized as high methoxyl pectins and do not require soluble calcium to set or form gels. High methoxyl pectins are further classified as being fast or slow setting. Pectins of 70 to 75 D.E are very fast setting.

It is important that pectins of the present invention are slow setting pectins essentially characterized as having a 50 to 65 D.E, preferably about 55 to 65 D.E. Selection of such slow setting pectins in combination with carrageenan allows for the production of finished dried gel products having good initial texture and eating characteristics in reduced drying times. Also, employment of extra slow set pectin (i.e., 55 to 65 D.E.) allows for the formulation of a slurry for deposition into starch molding cavities at near finish moisture (i.e., at high °Brix). In contrast, using rapid set up pectin is undesirable since a gellable slurry containing such a pectin sets up too quickly before being able to be deposited in the starch mold cavities. High methoxyl pectins form irreversible gels.

The present compositions essentially comprise about 0.5% to about 2% (wet basis), preferably about 0.7 to about 1.8%, and for best results about 0.8 to 1.0% high methoxyl slow setting pectin.

The second essential component of the gelling system is kappa carrageenan. Generally, carrageenan is a mixture of kappa, iota, and lambda carrageenan. Kappa carrageenan can be isolated and is commercially available. However, this commercially available kappa carrageenan can have impurity levels of iota carrageenan associated therewith. In contrast to pectin which forms an irreversible gel, kappa carrageenan forms a thermo-reversible gel , i.e., transitions from gel to sol and back to gel again with heating the system and then cooling it back again. An advantage of kappa carrageenan is that it sets up instantly after it cools to below its gelling temperature (which is dependent in part upon the concentration of ingredients). Thus the present gelling system comprises at least one gelling agent that slowly forms an irreversible gel and another that quickly forms a reversible gel. The kappa carrageenan forms a more brittle gel having a shorter texture. Also, when a thin boiling starch supplemental gelling agent is employed as described below, the kappa carrageenan attenuates the rate of starch retrogradation. Kappa carrageenan is calcium ion independent but interacts with potassium ion, i.e., increased gel strength with potassium ions. Kappa carrageenan is also more thermo stable than pectin or gelatin. Thus, a slurry containing carrageenan can be maintained for extended times as a liquid by keeping the slurry above the gelling temperature of carrageenan. Once the hot slurry is deposited in the mold, the cooling of the slurry rapidly sets the carageenan to form a gel even though the pectin component is still gelling. This allows the formed pieces to be handled even though the pectin component of the gelling system still setting.

The present compositions essentially comprise about 0.1% to about 0.6%, preferably about 0.2 to about 0.4% kappa carrageenan. In preferred embodiments, the weight ratio of added pectin to kappa carrageenan ranges from about 5:1 to about 2:1.

If desired, the gelling system can additionally comprise one or more supplemental gelling system components. One highly preferred supplemental gelling system component is a thin boiling starch. Such thin boiling are highly hydrolyzed such that aqueous solutions containing such thin boiling starches are characterized by being thin or as having a low viscosity. "Thin boiling starches" are an art recognized term, such products are widely available commercially, and the skilled artisan will have no difficulty selecting such materials for use herein. Preferred embodiments herein additionally comprise about 1.5% to about 10%, preferably about 2.5% to about 8% thin boiling starch. In one less preferred embodiment, the present compositions comprise a gelling system essentially comprising the added high methoxyl pectin and further essentially comprising a thin boiling starch but without kappa carrageenan. This embodiment is less preferred in part since the missing kappa carrageenan is not present to protect or reduce the rate of starch retrogradation.

The skilled artisan will appreciate that this thin boiling starch is added to the gellable slurry and is to be distinguished from any entrained starch (generally common corn starch) present in the finished products picked up or entrained as a result of the starch molding operation. The present finished gelled products can contain about 0.1 to about 1% entrained starch as a result of the starch molding operation. Of course, those gelled products prepared by other forming techniques, e.g., employing silicone molds, will not contain such entrained starch.

Still another optional supplemental gelling system component is gelatin. The gelatin can be derived from bovine (beef), porcine (pig), or piscine (fish) sources or can be of mixtures thereof. If employed, for products to be marketed in North America, the preferred structuring gelatin is supplied by beef gelatin. If present, gelatin can be used from about 1% to 6% of the composition.

Still another optional supplemental gelling system component is a glactomannan gum such as locust bean gum, guar gum, konjac flour, and mixtures thereof. Such glactomannan gums are to be sparingly used. Good results are obtained when used at levels of about 0.001 to about 0.1%.

An advantage of the present compositions is a reduction in the total amount of hydrocolloids required compared to comparable previous products on the order of about 25% less.

Still another advantage of the present compositions is that the products are less susceptible to hardening over time.

In particular, the presence of carrageenan reduces the rate at which the starch retrogrades or hardens. The reduction to hardening feature is particularly noticeable after about 5 months.

The essential and supplemental gelling system components are used within the above ranges in amounts and combinations such as to provide finished gelled products of the initial requisite gel strength at finished gelled product moisture contents. It will be appreciated that such gel strength measurements will alter over time as texture attributes change over months of storage due to such factors as starch retrogradation.

Gel strength or hardness can be measured both directly and expressed as grams force and indirectly expressed as a viscosity. To measure hardness a Kramer single blade shear cell was used. In this test, the test piece is placed over a slot in the base of the test fixture. A shear blade is then driven down at a constant speed down through the test piece, and the blade continues into the slot of the base. The recorded measurement is the peak force as the blade cuts through the test piece. The force transducer that records the test force is calibrated using metric weights, so the measurement units reported are in kilograms-force. Useful for performing this test is any Universal Testing machine such as is available from Instron or, preferably from Stable Micro Systems (e.g., using its Model TA.HD Texture Analyzer) The gel hardness can also be alternatively measured using a standard Brookfield viscometer (Model RVDV) with a helipath stand and D-T-bar spindle. These technique measures the force required to cut through a gelled liquid. The D-T-bar spindle rotates at a set speed and is slowly lowered by the helipath stand into the sample. The Brookfield measures the torque required for the spindle to "cut" through the sample. The helical pattern traced by the spindle as it both rotates (5 RPM) and is lowered causes the spindle to always be cutting through undisturbed gel. The cutting force or torque reading on the viscometer is an empirical measure of gel strength.

Temperature is critical to obtaining an accurate viscosity reading and thus the samples are tempered to 70° F. to 75°F. (21° C. to 24° C.) prior to testing. Reported values are averaged over five readings taken at regular time intervals and are read directly from the instrument display. The Brookfield RVDV reading is reported as centipoise (cps). Typical gel strength reading for the gel described herein using the Brookfield method range between 100,000 to 300,000 cps, most preferred being 150,000 to 250,000 cps.

It will be appreciated that the hot gellable slurry intermediate products of the present invention will not be characterized by such gel strength values but rather are in the form of hot fluid slurries.

Moisture

The present gelled finished products essentially comprise about 10% to 22% moisture, preferably about 16% to 20% moisture and for best results about 17–18%. This moisture level in combination with the high level of sweeteners result in finished products having an "intermediate" water activity ("$A_w$") ranging from about 0.4 to 0.70, preferably about 0.5 to 0.65 and for best results about 0.55 to 0.6.

It is an advantage herein that the hot gellable slurry intermediate compositions of the present invention are provided at near finished Brix requiring little finish drying and thus are characterized by equal or only slightly higher moisture contents ranging from about 14% to about 21%.

Optional Ingredients

Buffer and Sequestrant

The present food compositions can further comprise supplemental materials that function as a buffer and/or as a heavy metal sequestrants, e.g., a calcium sequestrant. Buffers of course function to adjust the pH of the finished products. Buffers are also desirable since small additions of various buffer materials can soften or harden the gel texture of the products. Since pectin components such as provided by fruit sources of nutritive sweeteners can interact with soluble calcium, a calcium sequestrant that binds up substantially available soluble calcium can be desirable. Binding up any soluble calcium (such as provided by make-up water used in processing to form the present products, or associated with the insoluble calcium ingredients as described below, etc.) is desirable to insure that the texture properties of the finished product remains constant or as nearly so as is possible, over extended storage time. A calcium sequestrant is especially desirable for calcium fortified variants herein.

The skilled artisan will appreciate that many materials usefully added to the present compositions will function both as a calcium sequestrant and as a buffer ingredient. For example, sodium citrate is highly effective as a buffer ingredient but is only a moderately effective calcium sequestrant. In contrast, sodium hexametaposphate is an excellent calcium sequestrant and, while useful as a buffer ingredient, is less effective as a buffer. Generally, sequestrant materials as used at lower concentrations that buffer materials. Further, buffers can employ added materials, e.g., citric acid, at lower levels, and a salt, thereof, e.g., sodium citrate, at higher levels. It will be appreciated that the skilled artisan can exercise considerable freedom to select, manipulate and combine these materials as required to provide desired endproducts from various ingredient sources and processing conditions.

For example, calcium buffers are also well known in the confection art. Suitable soluble calcium sequestrants for use include sodium or potassium citrates (e.g., trisodium citrate), phosphates (e.g., sodium tripolyphosphate), acetates, tartrates, malates, fumarates, adipates, ascorbates, ethylenediaminetetraacetate ("EDTA"), and mixtures thereof. Especially preferred for use herein as the sequestrant is a mixture of sodium citrate and sodium hexametaphosphate in a 15–20:1 weight ratio.

Generally, the amount of sequestrant will range from about 0.05 to 1% of the composition. Good results are obtained when the sequestrant(s) comprises for example, about 0.3% to 0.6% sodium citrate and about 0.1% to 0.3% of sodium hexametaphosphate.

An especially useful well known first buffer system is a a member selected from the group consisting of sodium citrate, potassium citrate and mixtures thereof. A second well know buffer combination is a mixture of sodium potassium tartrate in about a 5:1 weight ratio with sodium polyphosphate. Of course, mixtures of the first and second buffer systems are contemplated herein. Such buffers are generally used in the range of about 0.2% to about 1% of the present compositions. While generally useful, at excessive buffer levels, the gelable compositions can be over buffered and the finished product prepared therefrom can have an undesirably soft texture.

Calcium Phosphate Salt

The present food compositions and products fabricated therefrom can optionally further comprise an insoluble calcium salt of defined particle size in an amount effective to provide the desired calcium enrichment. Good results are obtained when the present fruit snack compositions and products contain about 50 to 1500 mg calcium per one oz (0.15 to 5.5% calcium). Better results are obtained when the calcium is present at levels of about 90 to 500 mg/oz (wet basis) of product (0.7 to 4.2%). For best results, the total calcium present ranges from about 90 to 200 mg per ounce (0.7 to 1.05%) of finished fruit product. Excessive calcium fortification is to be avoided in part because the finished product can exhibit an undesirable sticky and chalky texture somewhat like taffy.

Soluble calcium salts typically are expensive and contain low weight percentages of calcium. While calcium chloride is an exception to this generalization, addition of significant calcium levels supplied by calcium chloride impart an unacceptable salty and bitter flavor to dried sweetened fruit products.

Especially useful herein as the source of supplemental calcium is calcium phosphate. Calcium phosphate is generally available as a monobasic ($CaH_4(PO_4)_2 \cdot H_2O$), dibasic ($CaHPO_4 \cdot 2H_2O$) or tribasic ($Ca_3(PO_4)_2$) salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is commercially available in food chemicals codex grade from Monsanto or Rhone Poulenc, having the general formula $3Ca_3(PO_4)_2 \cdot Ca(OH)_2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also commercially available from Stauffer Chemicals in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

The skilled artisan will appreciate that while the present calcium phosphate salts are characterized herein as insoluble, of course, some small percentage will dissolve in water depending in part upon the temperature and pH. However, at the concentrations of calcium salt used both in the slurry and the dried fruit composition products herein, the great percentage is in a solid state.

While not wishing to be bound by the proposed theory, it is speculated herein that the taste and taste stability advantages of the present invention reside in part due to the relatively inert or unreactive nature of the insoluble calcium phosphate salts selected. These salts by being inert not only do not form complexes such as soluble calcium source materials but also are relatively unreactive to the oil soluble flavors selected for use herein.

Fat

Certain embodiments additionally can optionally comprise a fat (oil and/or solid) i.e., an edible fatty triglyceride. The fat component additionally affects the eating qualities of the present compositions. Inclusion of fat increases the shortness of the texture as well as reduces modestly the stickiness of the composition to the consumer's teeth. The fat ingredient can also assist in minimizing interaction between any oil soluble flavors included and the insoluble calcium ingredient.

The fat can comprise preferably about 0.1 to 8%, more preferably 0.5 to 5% and for best results about 1% to about 2% of the composition. Useful herein are fats and oils that are conventional for use in food products, especially for confections. Both conventional fatty triglyceridic materials such as oils and solid fats can be used herein as well as blends of fats and oils. Also useful herein are fats, especially partially hydrogenated oils such as canola, corn oil, safflower, soybean, coconut, cottonseed or fractionated oils, all of which have melting points above room temperature. Less preferred are animal derived fats. Employment of such particular fats is preferred due to a reduced tendency of the glyceridic component to grease out of the present fruit compositions. In other preferred variations, the oils are selected to have and provide higher levels of medium chain tryglycerides. While not proven and not universally accepted, it is believed by many in the art that the presence of medium chain tryglycerides beneficially enhances the bioavailability of calcium phosphate salts possibly by increasing calcium absorption. One suitable oil that provides high levels of such medium chain tryglycerides is canola oil.

In preferred embodiments, the fat component can additionally include lecithin and other emulsifiers, e.g., acetylated mono-glycerides, if desired.

Oil Soluble Flavors

Optionally, the present gel food products can further additionally include effective amounts of oil soluble flavor (s). Selection of oil soluble flavors to the exclusion of conventional water-soluble flavors has been found important to minimization of undesirable adverse interaction between the flavor and the calcium, if present. Such interaction can lead to the development of undesirable flavors as well as the loss of intensity of desired flavors. Indeed, calcium fortified embodiments of the present gel products are preferably free of added water-soluble, or alcohol, propylene glycol or glycerine-based flavors. (The last two may be in combination with oil-based flavors.). However, those embodiments that are not calcium fortified can beneficially comprise water soluble flavors.

If present, such oil soluble flavors can comprise effective amounts of such oil soluble flavors to provide desired flavor levels. Good results are generally obtained when the oil soluble flavors are present at from about 0.01% to about 2% of the finished products.

Additional Minor Ingredients

The present food compositions can optionally contain a variety of additional minor ingredients suitable for rendering such products more organoleptically acceptable, more nutritious and/or more storage stable. While not essential to the present food compositions, such optional components include fiber materials, high potency sweeteners, colors, coloring agents, vitamins, preservatives (e.g., sodium bisulfite), emulsifiers, calcium carriers (e.g., propylene glycol), dairy products (e.g., non fat dairy solids), and the like. Of course, highly preferred for use herein are "natural" ingredient additives. The present formulations can be fortified with various botanicals, nutriceuticals, and other nutrition or therapeutic ingredients, if desired. In certain variations, the products can be used as edible carriers for various drug ingredients.

Acidulant

In preferred embodiments, the present compositions further essentially comprise sufficient amounts of an edible organic acid or acidulant to provide the gel with a pH of about 3.0 to 5.5, preferably about 3.2 to 4.5, and for best results about 3.2 to 3.6. The particular pH selected from within this pH range depends in part upon the type of gelling ingredient employed as well as the organoleptic attributes desired. For example, in the preferred embodiment that contains high levels of fruit, the preferred pH range varies from about 3.2 to about 3.5. Good results are obtained when the edible organic salts are employed at levels ranging from about 0.1 to 1& preferably about 0.2% to about 0.8%.

A variety of edible organic acids can be used to adjust the pH of the present invention as well as to control the taste and tartness of the present products. Especially suitable for use herein are citric acid, tartaric acid, malic acid, lactic acid, fumaric acid, ascorbic acid and mixtures thereof especially in the form of sodium or potassium salts. In addition to providing a desired tartness to the flavor, such acidulants can affect the strength of the pectin gelling component.

In still another variation, the present products can further comprise about 0.15 to 10% inulin, preferably about 0.5% to 5% in partial substitution for the nutritive carbohydrate sweetening agents. Inulin or equally suitable like fructo oligo saccharides ("FOS") ingredients provide the benefits of soluble fiber without the adverse organoleptic or allergen features of such other soluble fiber materials such as oat bran, psyllium, beta glucan, and guar gum. Moreover, it is believed that inulin and/or FOS materials facilitate the absorption of calcium when provided in the form of calcium phosphate salts. It is an advantage herein that inulin and FOS materials behave in a manner similar to sugars which allows for ease of use and incorporation. Thus, inulin can conveniently be added to fruit and sugars blend in partial substitution therefor. Also, inulin's bland flavor makes inulin particularly suitable for use in children's products since children are notoriously sensitive to off flavors. Moreover, it is believed that there is a synergistic effect when both inulin and medium chain triglycerides are both present on the absorption of calcium from calcium phosphate salts.

Since the target consumers for the fruit gel food products are children, especially young children, in the preferred embodiment, the present products are desirably free of alcohol. It will be appreciated that trace amounts of alcohol may be present such as provided by the flavor component. Thus, alcohol free products herein will have less than 0.1% alcohol. Of course, those embodiments intended for sale for adults can comprise 0.5% to about 10% alcohol such as provided from various flavored liquors or other alcohol bearing ingredients.

The finished products are formed into suitably sized and shaped pieces. In a preferred embodiment, the pieces are bite sized ranging from about 1 to 8 g each. The pieces can, if desired, be imparted with a particular shape such as an animal or vehicle. The pieces can be of all one color or portions can be of additional colors.

In certain embodiments, the pieces are provided having a topical coating. In one variation, the topical coating can be of crystalline or granulated sucrose to provide a "sugared-"confection piece. In another variation, the topical coating of a lipid, such as oil or oilwax/blend, e.g., a 2:1 ratio blend of carnauba wax and mineral oil, can be applied to provide a shinny or glossy finish (e.g., 100:1 product to oil/wax coating). In still another variation, the topical coating can be in the form of a hard sugar shell. In still another variation, the topical coating can additionally include additional flavor, acids (citric), colors, preservatives, vitamins, and minerals. In one variation, for example, additional calcium phosphate salt is admixed with granular sugar to provide sugared confections that provides additional calcium fortification.

Generally, the weight ratio of base piece to topical coating ranges from about 10:1 to about 1000:1.

Method of Preparation

Referring now to the drawing, in its method aspect, the present invention provides methods for preparing the present food compositions and products therefrom. The present methods first essentially comprise the step of providing a hot gel forming fluid base blend or gellable slurry of the base constituents. The base constituents include the sugars (including any fruit based ingredients), calcium sequestrant, lipid (such as oil or fat) 16, supplemental dry gelling agent(s), hydrated gelling ingredients such as kappa carrageenan (optionally with thin boiling starch) 13 and hydrated added pectin 14.

Conventional methods and techniques can be used to practice step 20. The blend is a homogeneous fluid mass and not in the form of discrete pieces. Providing a base blend step is practiced at near finished products moisture contents. Typically, a base blend is prepared comprising about 70° to 86° Brix, preferably about 75 to 86% solids, and for best results about 80 to 86% solids. Step can be practiced with heating to remove any excess moisture 21 whether by indirect heat or by direct addition of steam to the blend. Lower moisture contents are preferred so as to reduce the duration of the subsequent hold step that involves drying to final moisture contents. The carrageenan can be added together with the other dry ingredients. Hydration of the carrageenan gelling agent can occur separately (not shown) or during cooking of the base blend 20. In one preferred variation, the pectin is hydrated separately in about a 5% aqueous solution. In still other variations, the thin boiling starch can be hydrated separately before addition to the base blend 20.

The base blend can be prepared in a continuous process, batch or semi-continuous processes. In more preferred embodiments, the base blend is characterized by a viscous but fluid consistency immediately prior to the forming step, e.g., having a viscosity of about 15,000 to 50,000 cps. preferably about 18,000 to 22,000 cps. Such a viscous yet fluid consistency facilitates forming the blend into pieces without forming trailing edges or other shape imperfections.

The base blend is heated to above the gelling temperature of the carrageenan, i.e., above 130° F. (55° C.), such as to about 76.6 to 87.7° C. (170° F. to 200° F.), preferably 79.4 to 85° C. (175 to 195° F.), and for best results about 82.2° C. (180 ° F) and held for 3 min to 2 hours prior to the flavor/color admixture step. Such heating is especially helpful to fully hydrate any gelling agents such as thin boiling starch.

In certain preferred embodiments, especially for batch or semi-continuous process, step can comprise the sub-step of providing an aqueous premix of dissolved sugar ingredients (including any fruit ingredients), bulking agents, preservatives, buffers, inulin and/or other FOS materials and optionally all or a portion of any starch gelling agents. This aqueous premix can be heated or cooked such as with steam 13 to temperatures 200–350° F. (195° C. to 175° C.) via steam injection with back pressure valve or a direct cook system can be employed to reach such temperatures.

Step can also include the substep of providing fat in liquid form optionally admixed with an emulsifier. For example, fat that is normally solid at room temperature can be heated to above its melting temperature to provide a fluid or liquid fat. Good results are obtained when the fat is heated to about 120° to 160° F. (48° C. to 72° C.). The liquid fat can be admixed with an emulsifier such as lecithin. Good results are obtained when the ratio of fat to lecithin (or other emulsifiers) ranges from about 5:1 to about 20:1, preferably about 10:1. The fat can also be mixed with or substituted with an oil especially canola oil which is a good source of medium chain triglycerides.

The present invention further comprises a first admixing step of admixing the base blend with minor amounts of gel system gel strengthening agents such as an aqueous potassium solution and/or an aqueous solution of edible organic acidulants 24 to form the present gellable slurry 38. Since any added moisture must subsequently be removed, in preferred form, both potassium solution 22 and edible organic acidulants solution 24 are highly concentrated. In the preferred form, less than 2% added moisture is added by solutions 22 and 24. Conveniently, an aqueous dispersion of the acidulant(s) can be prepared comprising about 25 to 50% water. The moisture content of the base blend, solution 22, and acidulant solution 24 is controlled such that after blending, the gellable slurry 38 is of desired moisture content levels.

The potassium ingredient is selected to enhance the gel forming properties of the kappa carrageenan. Additionally, certain potassium compounds (e.g., potassium tartrate) can additionally function as buffer component or as an anti-mold ingredient component (e.g., potassium sorbate). Edible organic acidulant solution 24 functions not only to provide desired pH (3.0 to 5.5) which is important to taste but also strengthens the gel forming properties of the added pectin. In preferred form, edible organic acidulants are added as sodium and/or potassium salts. When all or a portion of edible acidulants are added as potassium salts, then the amount of potassium solution 22 can be adjusted to accommodate the potassium added from solution 24. Good results are generally obtained when the gellable slurry 38 comprises about 0.02% to 0.2% potassium, more preferably from about 0.04% to 0.07%.

Solutions 22 and 24 can be heated or added at room temperature. In still other variations, solutions 22 and 24 can be combined before addition to the base blend and calcium slurry 24. In still other variations (not shown), all or a portion of the edible organic acidulants can be added together with the dry ingredients 12.

First admixing step can further include a substep of providing an insoluble calcium phosphate salt slurry 24 by mixing the calcium phosphate with a non aqueous liquid carrier, preferably all or at least a portion of the fat. If a fat that is normally solid at room temperature is selected for use, then the fat is first heated above its melting point and maintained at temperatures hot enough to maintain as a fluid even after the calcium phosphate salt is added. If an oil is selected then, the oil can be but is not necessarily heated. If desired, all of the added calcium phosphate ingredient(s) can be combined with a portion of the oil and/or fat and added to the base blend to form a calcium fortified gel blend. Also, if desired, a portion of the fat can be added separately. The fat carrier can be and preferably does contain an emulsifier to facilitate the dispersion of the calcium phosphate in the fat slurry. Also, the fat provides a convenient means for evenly adding any included emulsifier. The weight ratio of calcium phosphate to oil in the slurry can range from about 1:1 to about 1:10, more preferably from 1:2 to about 1:3. At higher levels of calcium, the slurry can become pasty and thus difficult to pump or otherwise handle. At lower calcium levels, more fat can be added to the composition than might be desired.

In other embodiments, a calcium slurry 24 can be also be provided wherein the liquid carrier comprises a non-aqueous water soluble carrier. Non-aqueous carriers provide an advantage since they do not add back moisture to the dried fruit. Excessive moisture addition can result in product instability. Preferred for use herein for the non-aqueous carrier is an ingredient selected from the group consisting of propylene glycol, glycerin and mixtures thereof. For example, a first essential fat based calcium slurry can be used to supply about ½ of the desired supplemental calcium, e.g., tricalcium phosphate. This calcium-in-fat slurry is then added to the base blend 20. A supplemental second blend wherein the carrier comprises propylene glycol and/or glycerin can also be used to provide the other ½ of the calcium material whether the same or a different material, e.g., dicalcium phosphate.

Generally, the calcium slurry 26 comprises the maximum feasible amount of calcium phosphate so as to minimize carrier addition to the present food compositions. Good results are obtained when the slurry comprises about to 70% calcium phosphate, preferably to 50%, and about 10 to 90% carrier, preferably about 50 to 75% carrier so as to form an easily pumpable slurry. For best results, a 25:75 mixture of calcium phosphate and liquid carrier mixture is used as the slurry. In a less preferred variation, the tricalcium phosphate ("TCP") is added as a simple dry material without a carrier. In this embodiment, the TCP is added as a fine powder.

In more preferred embodiments, the calcium slurry is added to a cooked aqueous premix or blend so as to avoid exposure of the blend with the insoluble calcium for extended times at elevated temperatures. This practice minimizes undesirable adverse reactions that can lead to off-flavors.

In a less preferred embodiment, a portion of the calcium is provided wherein the carrier is water. The present calcium phosphate materials are highly alkaline, especially when dispersed in water. In order to avoid altering the pH of the finished fruit products when the calcium phosphate is admixed and avoid an impact on the taste of the products, it is important to "adjust" the aqueous calcium phosphate slurry. The pH is brought to the approximate acidity of the dried fruit composition being fortified by addition of the calcium. It is also important to avoid over acidifying the calcium phosphate. Thus, the pH should be within a few tenths of a pH of the dried fruit composition.

Since the pH of the gel finished products in the preferred fruit containing form generally will range from about 3.0 to 5.5, good results are generally obtained when the aqueous slurry pH ranges from about 3.2 to 4.6, preferably about 3.2 to 3.6. The preferred pH of the calcium slurry is at the pH of the dried fruit composition or below.

The slurry pH is adjusted to particular values within the above range by addition of an acid or acidulant. Useful herein as the acidulant are adipic, citric acid, fumaric, malic acid, and mixtures thereof. Preferred for use herein as an acidulant is citric acid. When in the preferred form the slurry is free of water, then sufficient amounts of edible organic or mineral acid is added to the wet fruit blend before drying such that the final product is within the desired pH range after addition of the calcium phosphate.

Most importantly, the calcium phosphate has a particle size such that 90% has a particle size of less than 150 microns ("$\mu$m"), that is, a fine powder. Having a calcium phosphate being of[]sufficiently reduced particle size is to avoiding a "grittiness" organoleptic attribute in the finished dried fruit composition.

A useful technique for ensuring that the calcium phosphate is of the requisite particle size in small-scale production is to screen a calcium phosphate starting material. For example, a maximum of 0.5% on a #100 U.S. standard sieve and a minimum of 95% through a #100 U.S. standard sieve is preferred (wet sieve method).

Another technique is to employ a supplemental size reduction step 26 (shown in FIG. 1 with a dashed/optional line) after calcium slurry preparation but prior to admixture with the base blend 20. Suitable supplemental size reduction techniques include, for example, passing the slurry through a colloidal mill, passing the slurry through mesh screens/strainers, using a high speed shear impeller in the blender in which the slurry is prepared.

Preferably, the size reduction step results in a slurry wherein the calcium salt has mean particle size of 100 $\mu$m and for best results a mean particle size of less than 50 $\mu$m ("50 $\mu$m>").

When an aqueous carrier is employed, the slurry makeup can include a heating substep with vigorous agitation to insure hydration and/or suspension of the insoluble calcium salt.

All or part of the calcium sequestrant can optionally be added to the sugars preblend 12 or directly into the cooked base blend or a portion into each.

It will be appreciated that these steps can be performed simultaneously as well as in various order combinations.

In certain embodiments, the fruit material is quite bland and/or lacks a strong color, e.g., when white grape puree solids and/or pear juice supply the fruit source. If desired, the gellable slurry 38 can then be divided into a plurality of substreams such as into first and second substreams shown in FIG. 1. If desired, supplemental colors and flavors can be admixed into the substreams of gellable slurry 38, preferably after cooling (not shown) to about 130° F. to 200° (55° C. to about 95° C.), preferably about 130° F. to about 150° F. (55° C. to about 70° C.) to avoid extended exposure of the sensitive flavor materials to elevated temperatures, for color and flavor manipulation of the fruit composition. It will be appreciated, however, that even after such cooling the cooled gellable slurry 38 is still above the gelling temperature of the kappa carrageenan and thus the slurry 38 is still fluid within the desired viscosity range. Since the calcium phosphate salt is white and of fine size, a colorant is preferred for use to mask the white color of the calcium phosphate salt. A first color and/or flavor or color #134 can be admixed in step 40A with the first substream of gellable slurry 38 to form a first flavored and colored substream while a second favorcolor blend #2 36 can be admixed in step 40B with the second substream of gellable slurry 38 to form a second flavored and colored substream. Thus, it is an advantage of this embodiment, that a single supply or vessel of gellable slurry 38 can conveniently be used to prepare food compositions and products therefrom of equivalent nutrition to form a plurality or a multiplicity of any desired number of different colors and/or flavors.

Any suitable technique for uniformly blending the gellable slurry 38 with flavor and color can be employed. Preferred for use herein for practicing the second admixing step 40 is to employ in-line static mixers since the addition is accomplished with minimal shear being imparted.

Thereafter, the flavored and colored gellable slurry compositions so prepared can be formed, and the present methods essentially comprise the step 50 of forming, into suitably sized and shaped individual pieces.

Conveniently, the well-known starch mold casting techniques can be used to practice the piece-forming step 50. Starch molding is often referred to in the trade as the Mogul system 52. Generally, the starch mold casting process involves the steps of forming the gellable slurry 38 into pieces 50 such as depositing into a multiplicity of starch cavity molds or depressions or suitable shape and size formed into starch beds. At the beginning of this step 50, importantly the gellable slurry 38 is in the form of a viscous but fluid or plastic mass so that the compositions can take the shape of the mold even if complexly shaped. If, however, the slurry 38 is too viscous or is allowed to cool to below the gellation temperature of the carrageenan, then the shapes taken can be defective.

The present methods further essentially comprise a curing or holding step 60 during which the compositions are allowed to set to form individual pieces of gelled products and to dry to desired final moisture contents. As shown, a minor amount of moisture 62 is removed during step 60. It is an advantage of the present invention that curing times are greatly reduced compared to conventional starch molding techniques. Curing times can be reduced from about 25% to up to 95% and can range herein from about 0 to 12 hours.

For "high moisture" gellable slurry 38, e.g., having a solids concentration of about 75° Brix to 82° Brix curing and drying times typically range from about 12 to 48 hours. Typically, the pieces lose about 1% to 4% moisture during the curing/drying step 60. Drying temperatures are typically 60° F. to 150° F. (15° C. to 65° C.). For those highly preferred low moisture gellable slurry 38 variations requiring little or no moisture removal, i.e., above 83° Brix, the duration of the curing step 60 can be much shorter even less than one hour. In certain very high solids embodiments or at finish °Brix requiring no drying, the cure step simply involves cooling the gelable mixture to below the gel setting temperature of the kappa carageenan of about 130° F. Upon such cooling, the kappa carageenean sets up immediately and the pieces are formed into gelled pieces. The pectin gelling agent will continue to set over time but the pieces can be further processed while the pectin continues to set.

Generally, the starch molding step is the bottleneck in a production facility. Thus, one potential benefit of reduced holding times is higher productivity and higher throughputs for a given production facility. Still another advantage is a reduction or possible elimination of the expense of providing drying room(s)/space.

In these embodiments, the curing step can be practiced using the starch mogul process or employing other suitable molding techniques, e.g., in silicone based fixed shape molds.

As a result of curing in such starch molds, the finished pieces can acquire modest amount of additional starch such as about 1% to about 5% topical starch.

The present methods 10 further essentially comprise a step 66 of releasing the cured gelled food product from the starch molds such as by scalping. The Mogul system further involves recovery and reuse of the starch (not shown).

The pieces so formed can range in size from about 2 to 10 g, preferably about 1 to 5 g. In preferred embodiments, the gel pieces are formed into shapes having an ornamental configuration such as geometric shapes or shapes of animal or vehicles.

The individually shaped pieces can then be subsequently packaged in conventional manner. Especially useful are moisture sealed pouches fabricated from flexible film packaging impermeable flexible holding about 5 to 15 individual pieces collectively weighing about 25 to 50 g.

The finished products are soft, pliable products of both good flavor and eating quality. The products exhibit good initial flavor characteristics as well as prolonged resistance to flavor and texture degradation at room temperature storage. The food products so formed are characterized by being nutritious, wholesome snacks.

In further variations of the present invention, the gel food pieces can be provided with a topical coating. The methods of preparation can further comprise a step of applying a topical coating 80. In one variation, the topical coating application step can involve applying a coating comprising a liquid oil optionally admixed with a wax to provide coated finished calcium fortified food pieces having a desirable shiny appearance. A blend of liquid oil and paraffin in a weight ratio of about 5:1 to about 15:1 is heated to a temperature of about 110° F. to 140° F. (45° C. to 60° C.). The oil/wax blend is applied in an enrober in a weight ratio of gel food pieces to oil/wax coating of about 100:1 to about 1000:1.

In another variation, the topical coating can involve applying (with moisture 82) granular sugar coating 84 to form a "sugared" coating to provide a "sugared" type coated gel food piece that is calcium fortified. In still other variations, the sugared coating can additionally additional insoluble calcium salts 86. In still other variations, the coating step can involve a panning operation to provide a hard shell or candy coating. In addition the application of a granular acid such as citric acid to the surface is possible. The weight ratio (dry basis) of gel food piece to coating ranges from about 10:1 to about 100:1, preferably about 15:1 to about 50:1.

The gel food products so prepared can be conventionally packaged and distributed.

The present invention is illustrated by the following:

EXAMPLE 1

A fruit product of the present invention is prepared from the following formulation:

| Ingredient | Weight % |
| --- | --- |
| Pear juice Concentrate (dry basis) | 9.00 |
| Corn syrup (dry basis) | 32.00 |
| Sucrose | 30.00 |
| Thin boiling Starch | 6.00 |
| Pectin (60 D.E.) | 1.20 |
| Canola oil | 2.00 |
| Lecithin | 0.20 |
| Sodium Citrate | 0.40 |
| Tricalcium phosphate | 1.00 |
| Kappa Carrageenan | 0.30 |
| Sodium hexametaphosphate | 0.25 |
| Potassium citrate | 0.15 |
| Fruit acids (citric, malic, tartaric) | 1.00 |
| Ascorbic acid | 0.40 |
| Color/flavorings | 0.10 |
| Oil/wax coating | 0.09 |
| Sulfiting agent ($Na_2SO_4$) | 0.01 |
| Water | 16.00 |
| | 100.00% |

Twenty Kilograms of corn syrup, sucrose and fruit solids are blended together. Thereafter, the thin boiling starch and carrageenan are mixed into the fruit blend/corn syrup blend. The wet mixture has moisture content of about 25%.

The nutritive carbohydrate content is about 60%. The ratio of mono- to disaccharide is about 1.4:1.

The wet blend is then preheated in a kettle to about 82.2° C. (180° F.). Immediately thereafter, the wet mixture is cooked using steam injection or vacuum cooking at 230–350° F. to a moisture content of about 20% to form a sweetened fruit blend. A pectin water blend is prepared and heated to 180 (82° C.) to hydrate the pectin. This blend is added to the cooked base blend. Separately, slurry was prepared of 0.67 kg tricalcium phosphate and 1.73 kg canola oil. The tricalcium phosphate is screened through a #100 U.S. standard sieve to ensure a particle size of less than 150 microns. The canola oil is heated to about 110 ° F (45 ° C) and then admixed with the tricalcium phosphate to form the slurry blend.

Fruit Acid and potassium citrate are each separately added to initiate setting the pectin. Finally, the flavorings and colorants are added. The gellable slurry so formed has a solids content of about 82° Brix.

Thereafter, the calcium fortified gellable sweetened fruit composition is formed into finished gelled pieces using a starch molding technique. Small portions of the gellable calcium fortified composition are deposited into trays of starch into which impressions of the desired piece definition have been pressed.

The trays of deposited fruit slurry are allowed to dry for a period of about 12 hours. The final desired moisture of 16%.

EXAMPLE 2

A fruit product of the present invention is prepared from the following formulation:

| Ingredient | Weight % |
| --- | --- |
| Pear Juice concentrate (dry basis) | 10.00 |
| Sucrose | 31.00 |
| Corn Syrup (dry basis) | 33.00 |
| Thin boiling Starch | 7.00 |
| Pectin (60 D.E.) | 1.30 |
| Sodium Citrate | 0.40 |
| Potassium citrate | 0.10 |
| Fruit acids (citric, malic, tartaric) | 1.00 |
| Color/flavorings | 0.11 |
| Wax/oil coating | 0.09 |
| Final Water | 16.00 |
|  | 100.00% |

The total nutritive carbohydrate concentration is about 65%. The ratio of mono- to di-saccharides is about 0.78:1.

Finished gelled food pieces are prepared in a manner as described in Example 1.

What is claimed is:

1. A sweetened low moisture food product, comprising: about 55% to 85% nutritive carbohydrate sweeteners; a gelling system, including: about 0.5% to about 2% of an added high methoxyl pectin having a degree of esterification ranging from about 50 to 65 ;and about 0.1% to about 0.6% kappa carrageenan; about 0.1% to about 1% of an edible organic acidulant; and, about 10 to 25% moisture; wherein the food has a water activity ranging from about 0.5 to 0.6.

2. The food product of claim 1, additionally comprising: about 1.5% to 10% of a thin-boiling starch.

3. The food product of claim 1, additionally comprising: about 1% to about 6% gelatin.

4. The food product of claim 1 wherein at least a portion of the nutritive carbohydrate sweeteners are provided by edible plant solids.

5. The food product of claim 3 additionally comprising about 1.5% to 10% of a thin-boiling starch.

6. The food product of claim 2 wherein the gelling system comprises about 0.7% to 1.8% added high methoxyl pectin having a degree of esterification ("D.E.") ranging from about 50 to 65.

7. The food product of claim 6 wherein the gelling system comprises about 0.2% to about 0.4% kappa carrageenan.

8. The food product of claim 1 additionally comprising: about to 1% to 2.5% of an edible lipid or lipids.

9. The food product of claim 7 wherein the nutritive carbohydrate sweeteners have a weight ratio of mono-saccharides to di-saccharides that ranges from about 0.5:1 to about 1.8:1.

10. The food product of claim 1 wherein the gelling system includes sufficient amounts of edible organic acid to provide a gel pH of about 3.2 to 3.5.

11. The food product of claim 1 additionally comprising about 0.1% to about 10% fructo oligo saccharide.

12. The food product of claim 1 in the form of a gelled food having a gel strength of about 1–8 kg/cm$^2$.

13. The food product of claim 1 comprising about 0.6% to 5.5% calcium.

14. The food product of claim 13, wherein the calcium is provided by an insoluble calcium phosphate salt having a particle size distribution such that 90% have a particle size of less than 150 microns.

15. The food product of claim 14, wherein the calcium phosphate is supplied by an insoluble material selected from the group consisting of monobasic, dibasic or tribasic calcium phosphate salts, their hydrates and mixtures thereof.

16. The food product of claim 15, wherein at least a portion of the calcium is supplied by tricalcium phosphate.

17. The food product of claim 15, wherein the moisture content ranges from about 16% to 20% and has a water activity of about 0.50 to 0.60.

18. The food product of 12 having a moisture content of about 16% to 20%.

19. The food product of claim 18 in the form of individual pieces, each having a weight of about 1 to 5 g.

20. The food product of claim 19 wherein the individual pieces have a topical coating selected from the group consisting of crystallized sugar, a sugar shell or edible lipid.

21. The food product of claim 1 additionally comprising about 0.001% to 0.1% of a glactomannan gum.

22. The food product of claim 6 wherein at least a portion of the nutritive carbohydrate sweeteners is provided by fruit solids provided by fruit juice, fruit juice powders, fruit purees, fruit nectars, fruit pulp, concentrated fruit juice, or mixtures thereof.

23. The food product of claim 19 having been formed into individual pieces by starch molding.

24. The food product of claim 11 wherein at least a portion of the fructo oligo saccharide is inulin.

25. The food product of claim 8 wherein at least a portion of the edible lipid or lipids is medium chain length triglycerides.

26. The food product of claim 1 in the form of a liquid gelable food slurry.

27. The food product of claim 2 in the form of a liquid gelable food slurry.

28. The food product of claim 19, further comprising a sealed pouch fabricated from a flexible film material, wherein said food product is disposed within said sealed pouch.

* * * * *